(12) United States Patent
Olshansky

(10) Patent No.: US 11,855,986 B2
(45) Date of Patent: Dec. 26, 2023

(54) MANAGEMENT OF NETWORK INTERCEPT PORTALS FOR NETWORK DEVICES WITH DURABLE AND NON-DURABLE IDENTIFIERS

(71) Applicant: NOMADIX, INC., Woodland Hills, CA (US)

(72) Inventor: Vadim Olshansky, Tarzana, CA (US)

(73) Assignee: NOMADIX, INC., Woodland Hills, CA (US)

( * ) Notice: Subject to any disclaimer, the term of this patent is extended or adjusted under 35 U.S.C. 154(b) by 148 days.

(21) Appl. No.: 17/249,114

(22) Filed: Feb. 19, 2021

(65) Prior Publication Data
US 2021/0266319 A1 Aug. 26, 2021

Related U.S. Application Data

(60) Provisional application No. 62/979,973, filed on Feb. 21, 2020.

(51) Int. Cl.
*H04L 9/40* (2022.01)
(52) U.S. Cl.
CPC ...... *H04L 63/0892* (2013.01); *H04L 63/0876* (2013.01); *H04L 63/102* (2013.01); *H04L 63/107* (2013.01)
(58) Field of Classification Search
CPC ............. H04L 63/0876; H04L 63/0892; H04L 63/102
See application file for complete search history.

(56) References Cited

U.S. PATENT DOCUMENTS

2006/0239254 A1* 10/2006 Short .................. H04L 63/0892
370/352
2009/0125995 A1* 5/2009 Vercellone .............. H04L 69/40
726/6

(Continued)

OTHER PUBLICATIONS

Cisco, "Understanding RADIUS" [Online] Jun. 29, 2007 [Retrieved Aug. 3, 2022], Retrieved from: < https://www.cisco.com/c/en/us/td/docs/net_mgmt/access_registrar/1-7/concepts/guide/radius.pdf > (Year: 2007).*

(Continued)

*Primary Examiner* — Eric W Shepperd
(74) *Attorney, Agent, or Firm* — MORRISON & FOERSTER LLP (57) ABSTRACT

Generally described, the presently disclosed technology utilizes durable and non-durable identifiers of a user device to authenticate the user device and cause the user device to be directed to a network intercept portal or captive portal to the user device based on whether additional user input is needed from the user device. A cloud network management server may identify a user device based on a previously stored association between a durable identifier associated with the user device and a non-durable identifier associated with the user device. In response to an indication from the cloud network management server that additional input is needed, a gateway or network management device can indicate to the access point that network access has been granted to the user device, but redirect the user device to network intercept portal or captive portal to obtain the additional user input requested by the cloud network management server.

14 Claims, 9 Drawing Sheets

(56) References Cited

U.S. PATENT DOCUMENTS

| | | | |
|---|---|---|---|
| 2009/0183247 A1* | 7/2009 | Kasper | H04L 63/0892 726/7 |
| 2011/0302643 A1* | 12/2011 | Pichna | H04W 12/08 726/7 |
| 2012/0290724 A1* | 11/2012 | Noro | H04L 61/4511 709/225 |
| 2013/0291068 A1* | 10/2013 | Huang | H04L 67/02 709/202 |
| 2014/0068030 A1* | 3/2014 | Chambers | H04L 41/0809 709/220 |
| 2014/0195380 A1 | 7/2014 | Jamtgaard et al. | |
| 2015/0089592 A1* | 3/2015 | Han | H04W 12/06 726/4 |
| 2015/0089594 A1* | 3/2015 | Subramanian | H04L 63/08 726/4 |
| 2016/0211991 A1 | 7/2016 | Han et al. | |
| 2016/0248815 A1* | 8/2016 | Ho | H04L 65/61 |
| 2017/0230905 A1* | 8/2017 | Pularikkal | H04W 48/14 |
| 2019/0124041 A1* | 4/2019 | Williams | H04L 63/145 |
| 2019/0253409 A1* | 8/2019 | Spencer | H04W 12/73 |
| 2019/0253891 A1 | 8/2019 | Spencer | |

OTHER PUBLICATIONS

International Search Report and Written Opinion of PCT Application No. PCT/US2021/018914—19 pages (dated Apr. 8, 2021).

* cited by examiner

MANAGEMENT OF NETWORK INTERCEPT PORTALS FOR NETWORK DEVICES WITH DURABLE AND NON-DURABLE IDENTIFIERS

CROSS-REFERENCE TO RELATED APPLICATIONS

This application is a nonprovisional of U.S. Provisional Application No. 62/979,973, filed Feb. 21, 2020, titled "NETWORK INTERCEPT PORTAL WITH HOT SPOT 2.0," the disclosure of which is hereby incorporated by reference in its entirety.

TECHNICAL FIELD

The present disclosure relates to the field of providing computer network access.

BACKGROUND

A network management system can be used to provide access to a network, such as the Internet, to multiple users. Some types of network management systems can be used to provide access to multiple users and their corresponding network capable user devices. Network management systems can be used to control internet access in public and private venues. At a given time, network management systems may manage hundreds or thousands of user devices requesting content from the Internet.

BRIEF DESCRIPTION OF THE DRAWINGS

The embodiments described herein are illustrated by way of example, and not by way of limitation, in the figures of the accompanying drawings in which like references indicate similar elements.

DETAILED DESCRIPTION

Introduction

A typical network management system can receive network access parameters such as bandwidth, policy, and captive portal URL (Uniform Resource Locator) from an upstream RADIUS (Remote Authentication Dial-In User Service) server. In contrast, with Hotspot ("HS") 2.0 (EAP-SIM/AKA (Extensible Authentication Protocol Method for Global System for Mobile Communications (GSM) Subscriber Identity Module/Extensible Authentication Protocol Method for 3rd Generation Authentication and Key Agreement), EAP-TTLS (Extensible Authentication Protocol Tunneled Transport Layer Security), EAP-TLS (Extensible Authentication Protocol Transport Layer Security), or any other secure means of authentication 802.1x), the user's device gets authenticated by an upstream RADIUS and it then proceeds to seamlessly and securely connect and use the Wi-Fi without a captive portal. There is no current mechanism in HS 2.0/EAP-SIM/AKA/TTLS/TLS to enable a captive portal. However, there may be reasons to implement a captive portal even in HS 2.0 protocol as discussed below.

The Wi-Fi Alliance recently released new HS 2.0 Specification ("Release 3"). The new release includes three new ANQP (Access Network Query Protocol) elements: Operator Icon Metadata, Venue URL, and Advice of Charge Elements. The Venue URL element enables display of custom venue information on a user device. The manner of display is dependent upon the operator and implementation. The element identifies the URL and the network resource (such as a webpage) at the URL can be displayed after a user request or proactively when the device performs other ANQP requests. The Release 3 also includes network subscription remediation, which can include the process of fixing a problem in the subscriber's network subscription. This includes provisioning new credentials to a mobile device (e.g., due to expiration), updating the PerProviderSubscription (PPS) Management Object (MO) on a mobile device (e.g., because data needs updating), or performing an online function to update the network subscription.

While venueURL is similar to the captive portal, it is different in that the user is not really in a captive state. It is a webpage that pops up on the user device for several seconds that displays a remote URL. The user can ignore actions required in the URL and proceed with accessing the network. This URL can be remotely controlled at either a site-wide access point or at the individual device level as the URL comes from the upstream RADIUS in a vendor-specific attribute (VSA). This allows a large venue (such as a conference center or hotel), which might have areas (for example, the gym, restaurant, public area/reception, guest room) with different messaging requirements to inject different messages. So instead of having a traditional captive portal where the user has to register their email and room number or other items, the network management device or system can provide a message on the user's screen as the user unlocks his or her user device. In some instances, the venueURL can be used to enable a captive portal.

Hotspot 2.0 is a complicated specification. Most of the device manufacturers have not implemented the full specification. Therefore, not all user devices or operator devices may support the Release 3 features, such as venueURL of HS 2.0. Accordingly, HS 2.0 without the Release 3 features may not be able to perform additional authentication or venue-specific commands. For example, venue-specific commands may include accepting terms and conditions, correct a declined payment, or other use cases where the network provider needs to get the user to view and interact with a web portal to provide one or more additional inputs. In some instances, additional authentication may be required on top of the HS 2.0 authentication. The additional authentication may be based on the loyalty program. Accordingly, there is a need to implement some of these features in conjunction with HS 2.0 protocol.

These and other aspects of the disclosure will now be described with regard to certain examples and implementations, which are intended to illustrate but not limit the disclosure. Although the examples and implementations described herein will focus, for the purpose of illustration, on specific calculations and algorithms, one of skill in the art will appreciate the examples are illustrate only, and are not intended to be limiting.

Network Access System

Figure 1:
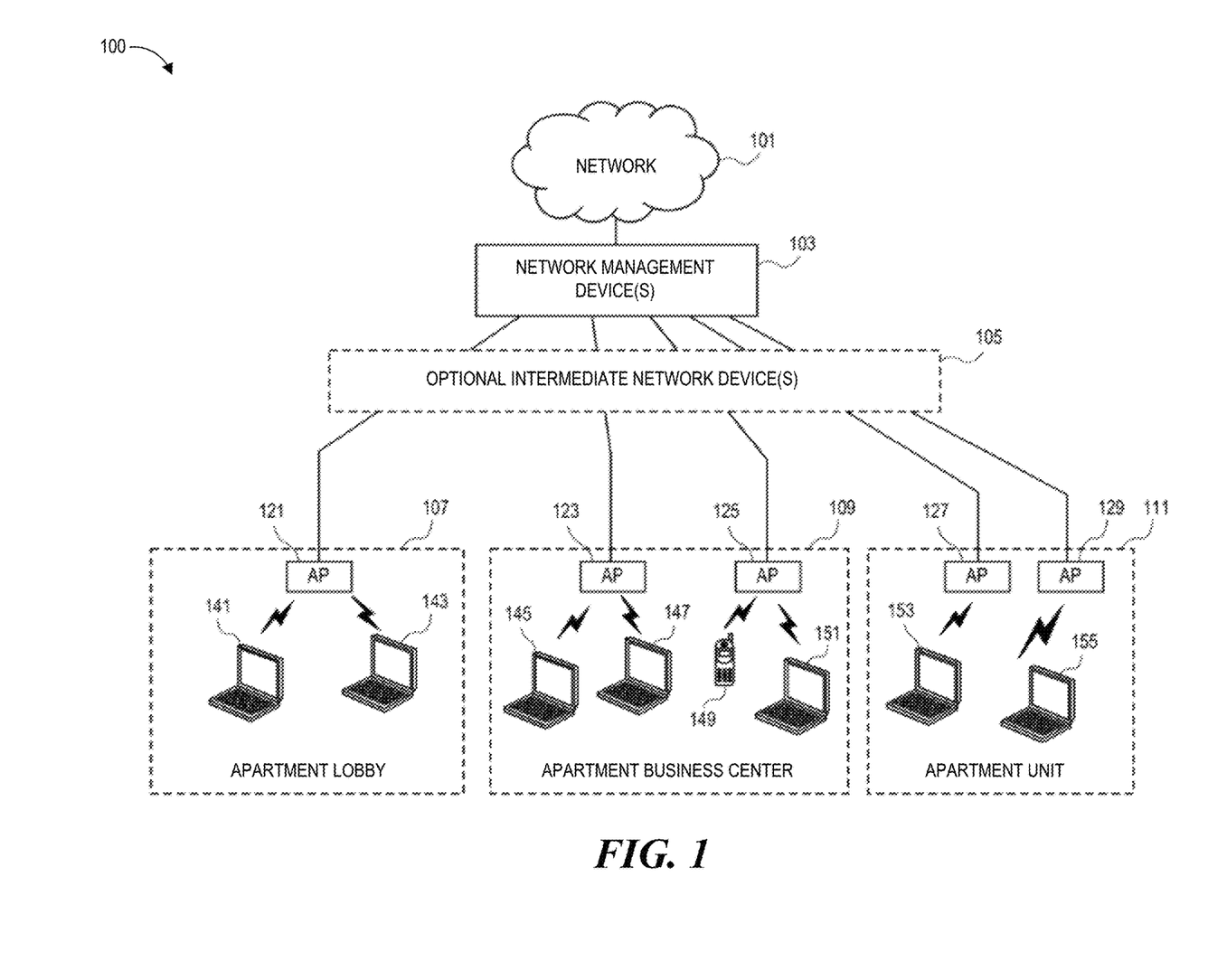
FIG. 1 illustrates an implementation of a network in accordance with aspects of this disclosure.

FIG. 1 illustrates an implementation of a network access system 100 that may be used to implement one or more of the techniques described herein. The system includes various user devices 141, 143, 145, 147, 149, 151, 153, 155. User devices can include, such as, for example, laptops, desktop computers, smartphones, PDAs (Personal Digital Assistants) and any other wired or wireless network enabled communication devices. The user devices 141, 143, 145, 147, 149, 151, 153, 155 communicate with access points 121, 123, 125, 127, 129. Access points 121, 123, 125, 127, 129 provide wired or wireless communications with network management device(s) 103. The network management device(s) 103 control network communications in-between access points and between the access points and network 101. In some implementations, the network management device(s) 103 are operated by a single entity. In an implementation, the network management device(s) 103 create a single network. Optionally, intermediate network device(s) 105 can also be used, including, for example, routers, switches, hubs, repeaters, etc. to assist in providing communications between access points 121, 123, 125, 127, 129 and network management device(s) 103. The network 101 can be, for example, a public network such as the Internet. Network management device(s) 103 (also referred to herein as a network management system) can include network gateways, such as, for example, network access gateways commercially available from Nomadix, Inc. of Woodland Hills, Calif. As will be understood by those of skill in the art from the present disclosure, other network management devices can also be used.

Devices are generally programmed to automatically select between access points, by, for example, determining which access point provides the strongest signal. A device may be in between three different access points and is able to communicate with all of them, but will eventually choose one access point to communicate with. In some cases, an access point will not allow a device to communicate through it, in which case the user device will attempt to communicate with another access point. For example, a user device may have the strongest signal with access point A, but may only be authenticated with access point B. In this case, the user devices will communicate with access point B despite the weaker signal. As will be understood, user devices can be configured to select access points based on any number of different selection options, including, for example, signal strength, bandwidth availability, access rights, access points corresponding to a particular SSID (Service Set Identifier), etc. When an access point is out of range, a user device will no longer be able to communicate with it and will attempt to find another access point. In an implementation, switching between access points is seamless, e.g. there is no loss of network session, and a user may not even realize that they have switched access points.

As illustrated in FIG. 1, the network includes multiple physical areas including apartment lobby 107, apartment business center 109, and apartment unit 111. Although not shown in FIG. 1, the network may include additional apartment lobbies, apartment business centers, and/or apartment units. Each physical area may include one or more access points. In some cases, two or more physical areas may share a single access point.

In some implementations, access points advertise their presence by broadcasting a Service Set Identifier (SSID), Extended Service Set Identifier (ESSID), and/or Basic Service Set Identifier (BSSID), or the like, collectively referred to herein as SSID. In some implementations, the same SSID is assigned to all access points in a network. In other implementations, a different SSID is assigned to each access point or a group of access points (or to each region or group of regions) in the network. In yet other implementations, multiple SSID's can be assigned to the same set of access points. In this respect virtual SSID's can be set up corresponding to different groupings of access points. The network management device(s) 103 may provide different levels of service to different users across multiple SSID's or across the same SSID based on the users' pre-shared keys (e.g., Wi-Fi passwords) and/or based on the durable and/or non-durable identifiers associated with the users' user devices, such as the MAC addresses and/or user profiles stored on the user devices (or one or more parameters included in the user profiles).

Levels of Service

Because the bandwidth accessed by all users can be centrally managed (e.g., by the wireless controller or wireless PSK (Pre-Shared Key) manager described herein, bandwidth limits can be set per user, per device, or per user type (e.g., resident or guest), regardless of the number of devices each subscriber might have. In an implementation, within a single SSID network, different levels of bandwidth (minimum and/or maximum), different levels of service, and/or different levels of access priority can be assigned to durable identifiers and/or non-durable identifiers associated with users or user devices. For example, each hotel room may be assigned one or more Wi-Fi passwords and/or login credentials within a single SSID network, and the assigned Wi-Fi passwords and/or login credentials may have different levels of bandwidth (minimum and/or maximum), different levels of service, and/or different levels of access priority (e.g., basic room vs. club-level rooms, etc., room-only access vs. property-wide access, and so on).

Multi-Dwelling Units (MDUs)

Figure 2:
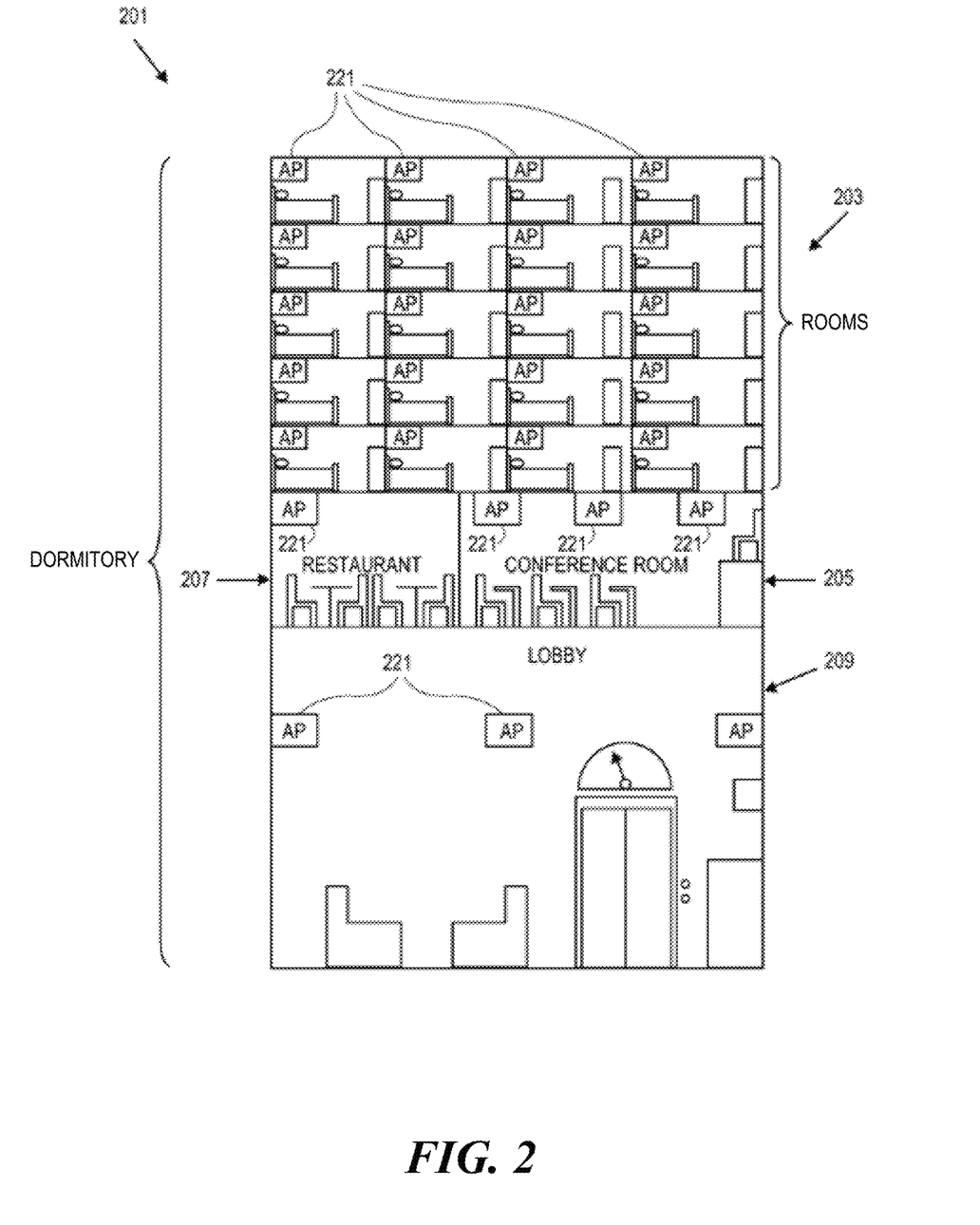
FIG. 2 illustrates a cross-section of various access points in the context of multi-dwelling units (MDUs) in accordance with aspects of this disclosure.

FIG. 2 illustrates a cross-section of various access points in the context of MDUs. Dormitory 201 includes rooms 203, conference room 205, restaurant 207 and lobby 209. The rooms 203, conference room 205, restaurant 207 and lobby 209 include various access points 221. Although illustrated as having one or more access points in each room, it is to be understood that fewer or more access points can be used. For example, in an implementation, a single access point can be used for multiple rooms. As will also be understood by those of skill in the art, many different types of facilities will benefit from the present disclosure. For example, although described mainly with respect to dormitories, other facilities can use the present network management system including apartment complexes, schools, colleges, universities, hospitals, hotels, government buildings, businesses, or any other public or private networking systems.

Network Management System

Figure 3:
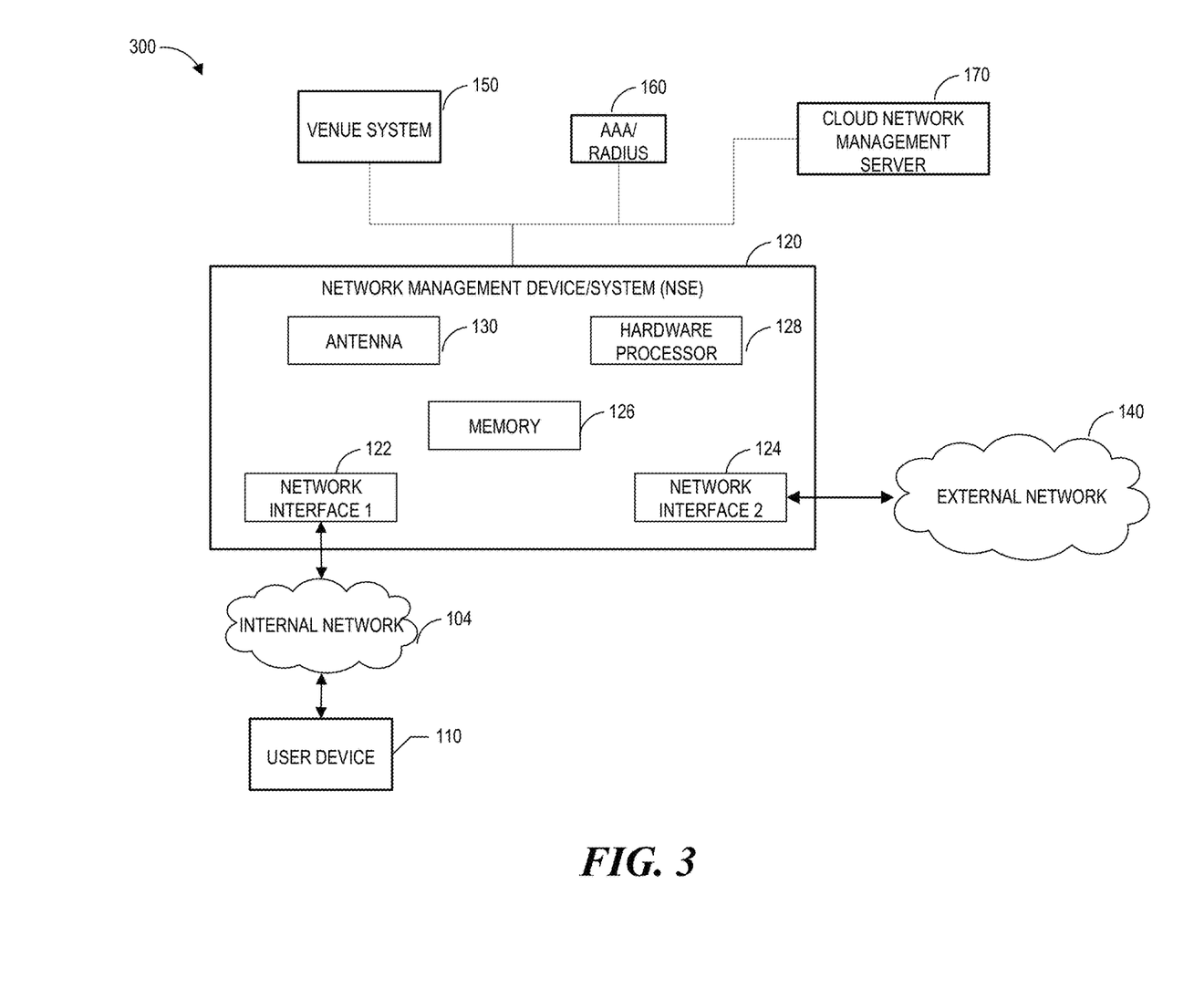
FIG. 3 illustrates a network environment including a network management system for connecting user devices to an external network in accordance with aspects of this disclosure.

FIG. 3 illustrates an embodiment of a networking system 300 including a network management system 120 for managing connections between a user device 110 on an internal network 104 and an external network 140, such as the Internet. The network management system 120 can include multiple hardware components. For example, the network management system 120 can include network interfaces 122 and 124 for receiving and transmitting network packets between an internal network and an external network. The size of the network packets may depend on the protocol or the type of data carried by the network packets. The network management system 120 can include an antenna 130 for receiving and transmitting data over a wireless network. The network management system 120 can include a memory 126 for storing packets and programming instructions that can be executed by a hardware processor 128. In some embodiments, the instructions can be stored in an internal memory of the hardware processor 128. While a single block is shown, the network management system 120 may include multiple hardware devices. In some embodiments, the network management system 120 can include a network gateway. The network management system 120 can also include one or more access points.

Users and user devices may be used interchangeably herein. A user may have one or more user devices associated with them. The user can use the user devices to request connection to an external network. The user devices may include a unique ID (such as a MAC Address Number or SIM card number). Further, users or user devices can also be identified based on membership ID, login ID, credit card information or any other identification parameter.

The network environment 300 can also include a venue system 150, an Authentication, Authorization, and Accounting (AAA)/RADIUS system 160, and a cloud network management server 170. The venue system 150 may include a computing system that is related to the property where users are requesting network access from their user devices. In an embodiment, the venue system 150 can include a property management system.

The AAA/RADIUS system 160 (also referred to herein as a RADIUS server) provides centralized Authentication, Authorization, and Accounting (AAA) management for users who connect and use a network service. Additional information regarding the RADIUS and AAA protocols is provided in Cisco, *Understanding RADIUS*, Jun. 29, 2007, which is incorporated herein by reference in its entirety.

The cloud network management server 170 provides a cloud solution that gives service providers (e.g., hotel owners, brands, managed service providers, etc.) greater control and visibility of their network capabilities and performance. For example, the cloud network management server 170 may provide a wide range of network management tools, including, for example, a Guest High-speed Internet Access (HSIA) portal, management and reporting capabilities, conference room scheduler, and a network management device (also referred to herein as a gateway, Nomadix Service Engine, or NSE). The cloud network management server 170 may also provide a full range of access plans and authentication types according to Passpoint® (also known as Hotspot 2.0). Although HS2.0 is used as an example herein, the techniques described herein can be applied to other standards or protocols.

The AAA/RADIUS system 160, the cloud network management server 170, and/or the venue system 150 can include information about the users and/or their user devices that can be used by a control system to determine whether to grant network access and/or how to allow the available bandwidth to be shared among the users and/or the user devices. The information can include loyalty points, class allocation, credit card, user preferences, login information, and the like.

Example Workflow for in-Band Portal Auth Method

Figure 4:
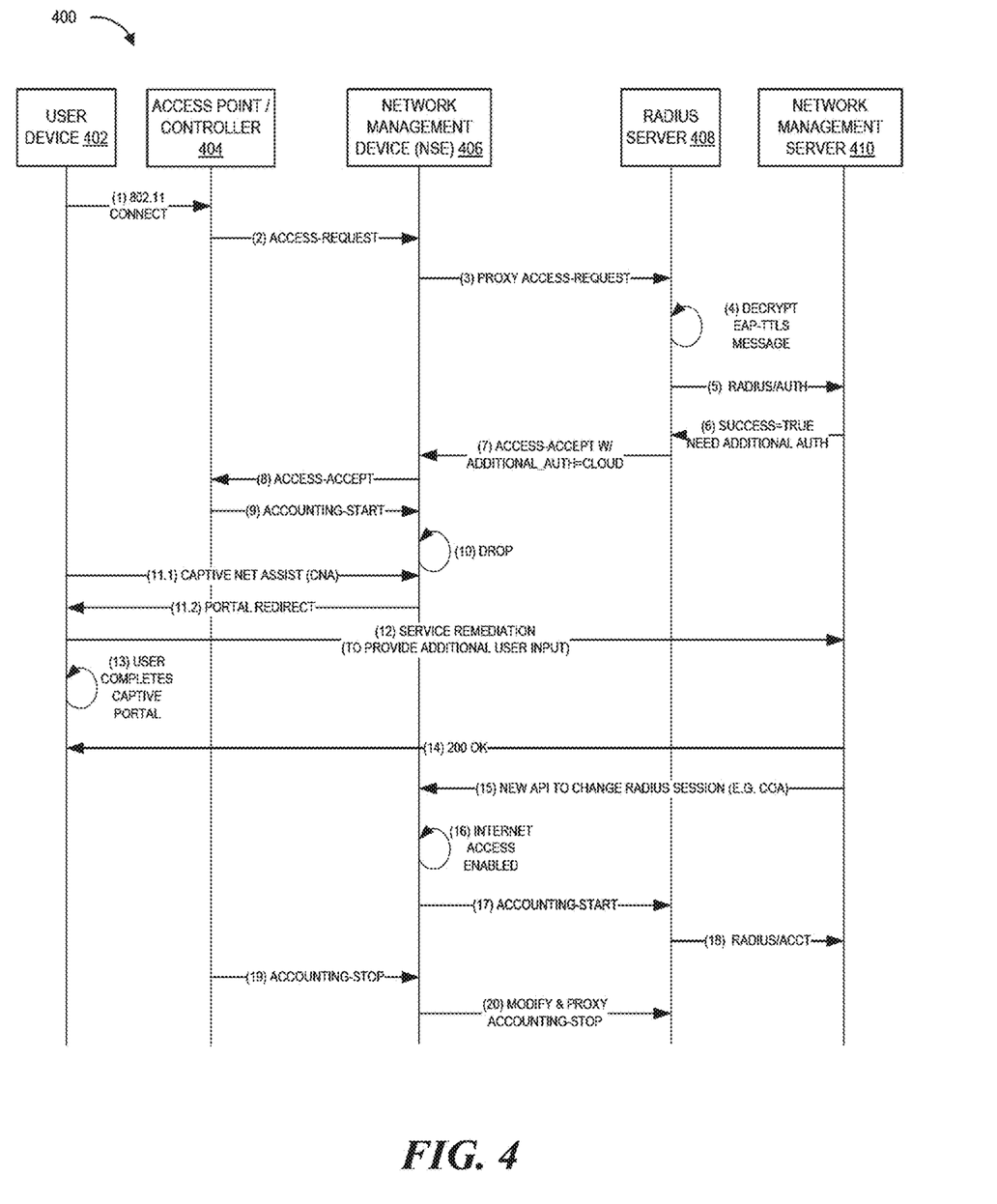
FIG. 4 illustrates a workflow for performing an in-band portal auth method in accordance with aspects of this disclosure.

FIG. 4 illustrates a workflow 400 for performing an in-band portal auth method in accordance with aspects of this disclosure. At (1), the user device 402 connects to the access point/controller (also referred to herein as AP) 404. At (2), the AP 404 sends an access request to the network management device (NSE) 406. At (3), the network management device 406 sends a proxy access request to the RADIUS server 408 (e.g., on behalf of the AP 404). At (4), the RADIUS server 408 decrypts the EAP-TTLS message. At (5), the RADIUS server 408 sends a RADIUS auth request to the network management server 410. At (6), the network management server 410 returns a success message to the RADIUS server 408, and also indicates to the RADIUS server 408 that additional user input is needed before network access can be granted to the user device 402. At (7), the RADIUS server 408 forwards the indication from the network management server 410 that the requested access has been granted but additional user input is needed.

At (8), the network management device 406 sends a message to the AP 404 indicating that the requested access has been granted, but does not indicate that additional input is needed. At (9), the AP 404, assuming that network access has been granted to the user device 402, sends an accounting start request to the network management device 406, to be forwarded to the RADIUS server 408. For example, the accounting start request packet may contain the user's ID, point of access, and network address, as well as a unique session identifier. At (10), the network management device 406 drops the accounting start request and does not forward it to the RADIUS server 408. At (11.1), the user device 402 accesses a network resource, and at (11.2), the network management device 406 causes the user device 402 to redirect to another network resource (e.g., a captive portal configured to receive the user's additional input required to be granted network access) different from that requested by the user device 402.

At (12), the user device 402 provides the additional user input requested by the network management server 410, and at (13), the user completes the captive portal. At (14), the network management server 410 sends an HTTP (Hypertext Transfer Protocol) 200 OK success status response to the user device 402, and at (15), sends a message to the network management device 406 to indicate that the user's RADIUS session should be changed (e.g., such that the user is no longer redirected to the captive portal). In response, at (16), the network management device 406 enables internet access for the user device 402. At (17), the network management device 406 sends an accounting start request to the RADIUS server 408, and at (18), the RADIUS server 408 sends a RADIUS account start message to the network management server 410. At (19), the AP 404 sends an accounting stop request to the network management device 406, indicating that the connection to the user device 402 has been terminated. At (20), the network management server 406 sends a proxy accounting stop request to the RADIUS server 408, on behalf of the AP 404.

Although not illustrated in FIG. 4, in response to (5) and/or (12), the network management server 410 may check the stored associations to identify the user device 402 using a non-durable identifier of the user device 406 (e.g., randomized MAC address), and determine whether the user device 402 has met all the requirements for being granted the auth request or network access request, and respond to the RADIUS server 408 or another component based on the determination.

In-Band Portal Auth Method

Figure 5:
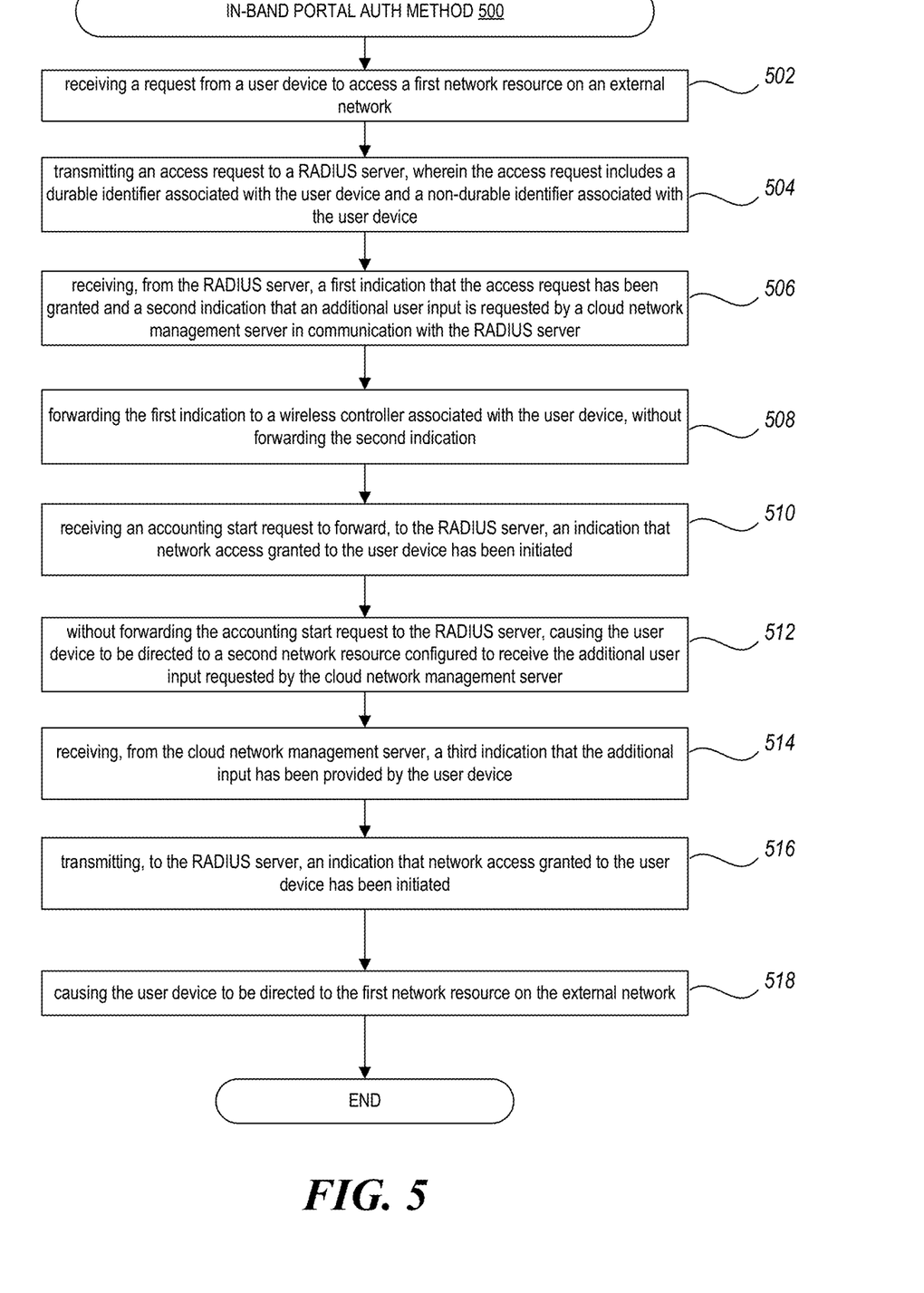
FIG. 5 illustrates an example in-band portal auth method in accordance with aspects of this disclosure.

With reference now to FIG. 5, an example in-band portal auth method 500 will be described. The example method 500 may be carried out, for example, by the network management device described in FIG. 3. The method 500 illustrates an example algorithm that may be programmed, using any suitable programming environment or language, to create machine code capable of execution by a CPU (Central Processing Unit) or microcontroller. Various implementations may be coded using assembly, C, OBJECTIVE-C, C++, JAVA, Ruby, or other human-readable languages and then compiled, assembled, or otherwise transformed into machine code that can be loaded into read-only memory (ROM), erasable programmable read-only memory (EPROM), or other recordable memory that is coupled to the CPU or microcontroller and then then executed by the CPU or microcontroller. For example, the network management device may include one or more hardware computing devices and non-transitory physical computer storage storing instructions that, when executed by the one or more hardware computing devices, cause the one or more hardware computing devices to perform the steps of the method 500. For convenience, the steps of the example method 500 are described as being performed by a network management device. In some implementations, one or more steps described herein as being performed by the network management device may be performed instead by the cloud network management server or another component described herein.

At block 502, the network management device receives a request from a user device to access a first network resource on an external network.

At block 504, the network management device transmits an access request to a RADIUS server, wherein the access request includes a durable identifier associated with the user device and a non-durable identifier associated with the user device.

At block 506, the network management device receives, from the RADIUS server, a first indication that the access request has been granted and a second indication that an additional user input is requested by a cloud network management server in communication with the RADIUS server.

At block 508, the network management device forwards the first indication to a wireless controller associated with the user device, without forwarding the second indication.

At block 510, the network management device receives an accounting start request to forward, to the RADIUS server, an indication that network access granted to the user device has been initiated.

At block 512, the network management device, without forwarding the accounting start request to the RADIUS server, causes the user device to be directed to a second network resource configured to receive the additional user input requested by the cloud network management server.

At block 514, the network management device receives, from the cloud network management server, a third indication that the additional input has been provided by the user device.

At block 516, the network management device, subsequent to receiving the third indication from the cloud network management server, transmits, to the RADIUS server, an indication that network access granted to the user device has been initiated. For example, the indication may be a RADIUS accounting-start message.

At block 518, the network management device causes the user device to be directed to the first network resource on the external network.

In the method 500, one or more of the blocks shown in FIG. 5 may be removed (e.g., not performed) and/or the order in which the method 500 is performed may be switched. In some implementations, additional blocks may be added to the method 500. The implementations of the present disclosure are not limited to or by the example shown in FIG. 5, and other variations may be implemented without departing from the spirit of this disclosure.

Example Workflow for Out-of-Band Portal Auth Method

Figure 6:
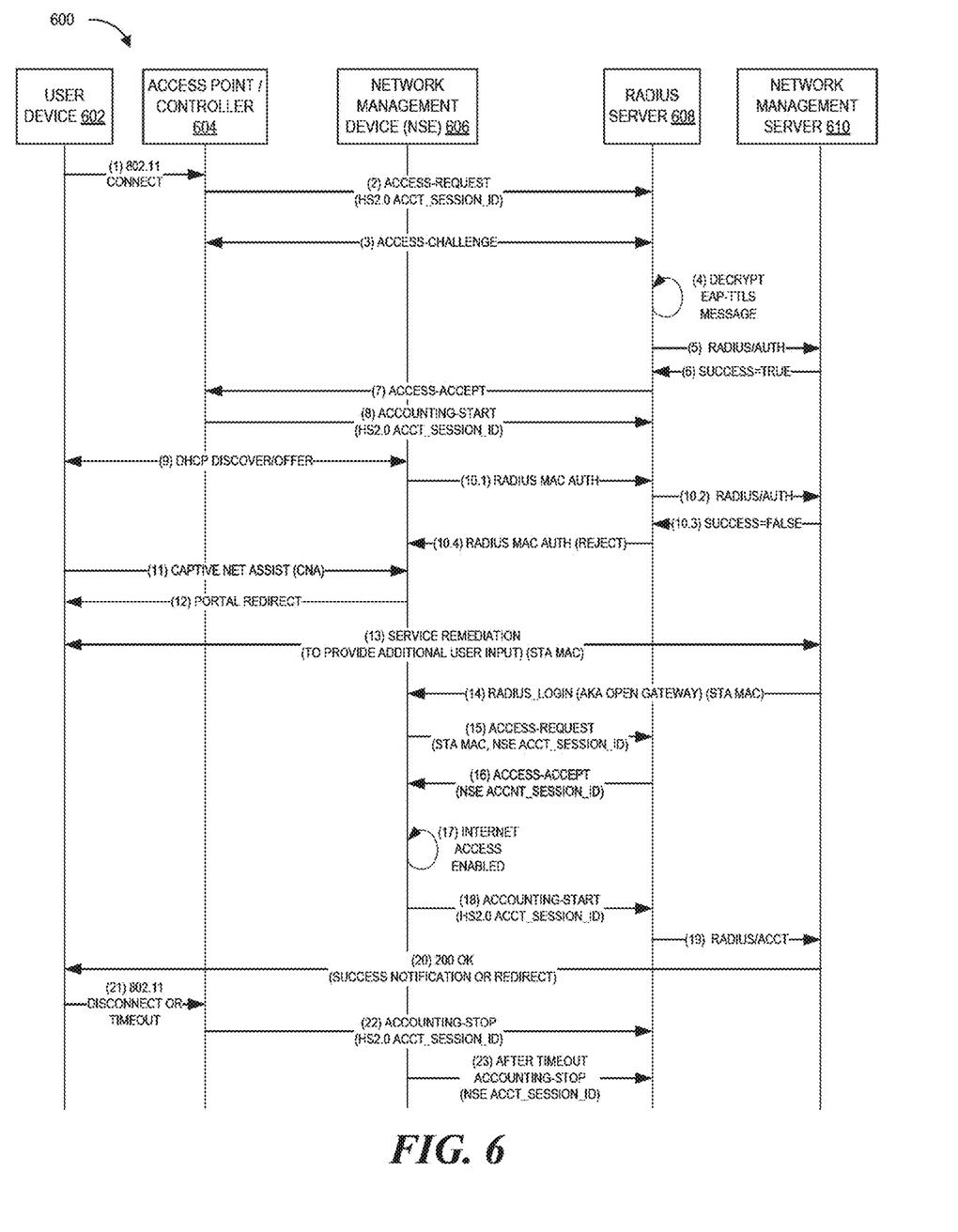
FIG. 6 illustrates a workflow for performing an out-of-band portal auth method in accordance with aspects of this disclosure.

FIG. 6 illustrates a workflow 600 for performing an out-of-band portal auth method in accordance with aspects of this disclosure. At (1), the user device 602 connects to the access point/controller (also referred to herein as AP) 604. At (2), the AP 604 sends an access request directly to the RADIUS server 608. At (3), the RADIUS server 608 sends an access challenge request to obtain additional information from the AP 604. For example, the additional information may include a user profile stored in the user device 602 and/or durable or non-durable identifiers of the user device 602. Alternatively, such information may be included in the request at (2). At (4), the RADIUS server 608 decrypts the EAP-TTLS message. At (5), the RADIUS server 608 sends a RADIUS auth request to the network management server 610. At (6), the network management server 610 returns a success message to the RADIUS server 608, indicating that the authentication request has been granted. At (7), the RADIUS server 608 forwards the indication from the network management server 610 to the AP 604.

At (8), the AP 604 sends an accounting start request to the RADIUS server 608, and at (9), the user device 602 initiates network access (e.g., by obtaining a DHCP lease). At (10.1), in response, the network management device 606 sends another authentication request to the RADIUS server 608, using the MAC address (or another durable or non-durable identifier associated with the user device 602). At (10.2), the RADIUS server 608 sends another RADIUS auth request to the network management server 610, and at (10.3), the network management server 610 rejects the RADIUS auth request, returning a message indicating that the auth request was not granted. At (10.4), the RADIUS server 608 sends a message to the network management device 606 indicating that the authentication request made at (10.1) was rejected, indicating that the user device 602 should be directed to a captive portal. At (11), the user device 602 accesses a network resource, and at (12), the network management device 606 causes the user device 602 to redirect to another network resource (e.g., the captive portal configured to receive the user's additional input required by the network management server 606 in order for the user device 602 to be granted network access) different from that requested by the user device 602.

At (13), the user device 602 provides the additional user input requested by the network management server 610 and submits the user input via the captive portal. For example, this request may include a randomized MAC address of the user device 602, and the network management server 610 may look up the randomized MAC address in its database storing associations between randomized MAC addresses and durable identifiers (e.g., one found in the Passpoint® or other user profile stored in the user device). Based on the information provided in the request satisfying the additional user input requirement, the network management server 610 determines that the user device 602 has satisfied all requirements for being granted network access, and initiates its process to remove the captive portal.

At (14), the network management server 610 sends a login request to the network management device 606 indicating that the additional user input requirements have been satisfied, and in response, at (15), the network management device 606 sends an access request to the RADIUS server 608. At (16), the RADIUS server 608 grants the access request (e.g., based on a prior indication from the network management server 610 or by requesting access to be granted by the network management server 610 in response to receiving the request at (15)). At (17), the network management device 606 enables internet access for the user device 602. At (18), the network management device 606 sends an accounting start request to the RADIUS server 608, and at (19), the RADIUS server 608 sends a RADIUS account start message to the network management server 610. At (20), the network management server 610 sends an HTTP 200 OK success status response to the user device 602 and/or directs the user device to a request network resource.

At (21), the user device 602 disconnects or times out, and at (22), the AP 604 sends an accounting stop request directly to the RADIUS server 608. At (23), the network management device 606 sends an after timeout accounting stop request to the RADIUS server 608.

Although not illustrated in FIG. 6, in response to (5), (10.2), and/or (19), the network management server 610 may check the stored associations to identify the user device 602 using a non-durable identifier of the user device 606 (e.g., randomized MAC address), and determine whether the user device 602 has met all the requirements for being granted the auth request or network access request, and respond to the RADIUS server 608 or another component based on the determination.

Out-of-Band Portal Auth Method

Figure 7:
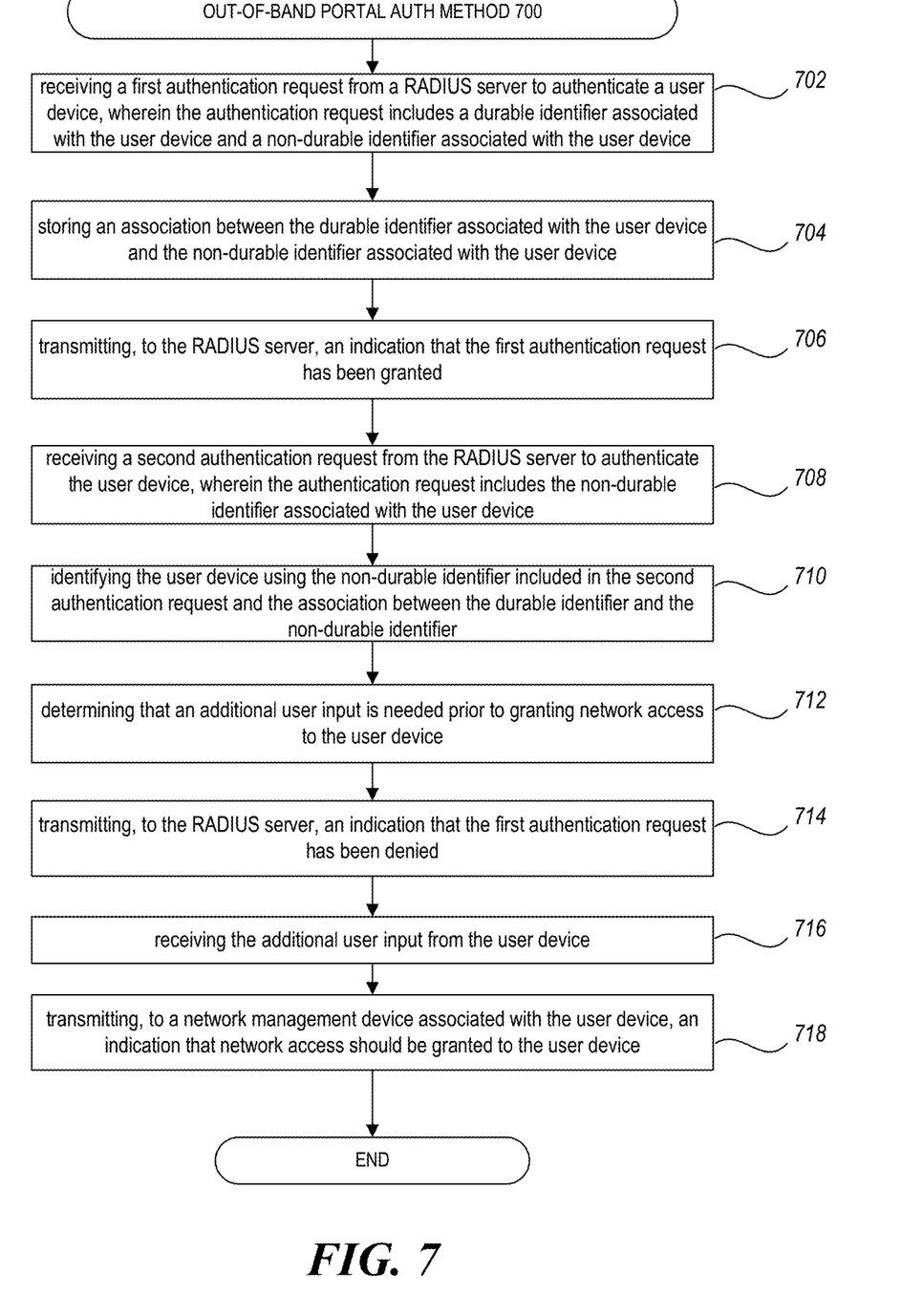
FIG. 7 illustrates an example out-of-band portal auth method in accordance with aspects of this disclosure.

With reference now to FIG. 7, an example in-band portal auth method 700 will be described. The example method 700 may be carried out, for example, by the cloud network management server described in FIG. 3. The method 700 illustrates an example algorithm that may be programmed, using any suitable programming environment or language, to create machine code capable of execution by a CPU or microcontroller. Various implementations may be coded using assembly, C, OBJECTIVE-C, C++, JAVA, Ruby, or other human-readable languages and then compiled, assembled, or otherwise transformed into machine code that can be loaded into read-only memory (ROM), erasable programmable read-only memory (EPROM), or other recordable memory that is coupled to the CPU or microcontroller and then then executed by the CPU or microcontroller. For example, the cloud network management server may include one or more hardware computing devices and non-transitory physical computer storage storing instructions that, when executed by the one or more hardware computing devices, cause the one or more hardware computing devices to perform the steps of the method 700. For convenience, the steps of the example method 700 are described as being performed by a cloud network management server. In some implementations, one or more steps described herein as being performed by the cloud network management server may be performed instead by the network management device or another component described herein.

At block 702, the cloud network management server receives a first authentication request from a RADIUS server to authenticate a user device, wherein the authentication request includes a durable identifier associated with the user device and a non-durable identifier associated with the user device.

At block 704, the cloud network management server stores an association between the durable identifier associated with the user device and the non-durable identifier associated with the user device.

At block 706, the cloud network management server transmits, to the RADIUS server, an indication that the first authentication request has been granted.

At block 708, the cloud network management server receives a second authentication request from the RADIUS server to authenticate the user device, wherein the authentication request includes the non-durable identifier associated with the user device.

At block 710, the cloud network management server identifies the user device using the non-durable identifier included in the second authentication request and the association between the durable identifier and the non-durable identifier.

At block 712, the cloud network management server determines that an additional user input is needed prior to granting network access to the user device.

At block 714, the cloud network management server transmits, to the RADIUS server, an indication that the first authentication request has been denied.

At block 716, the cloud network management server receives the additional user input from the user device.

At block 718, the cloud network management server transmits, to a network management device associated with the user device, an indication that network access should be granted to the user device.

In the method 700, one or more of the blocks shown in FIG. 7 may be removed (e.g., not performed) and/or the order in which the method 700 is performed may be switched. In some implementations, additional blocks may be added to the method 700. The implementations of the present disclosure are not limited to or by the example shown in FIG. 7, and other variations may be implemented without departing from the spirit of this disclosure.

Example Network Architecture and Workflow

Figure 8:
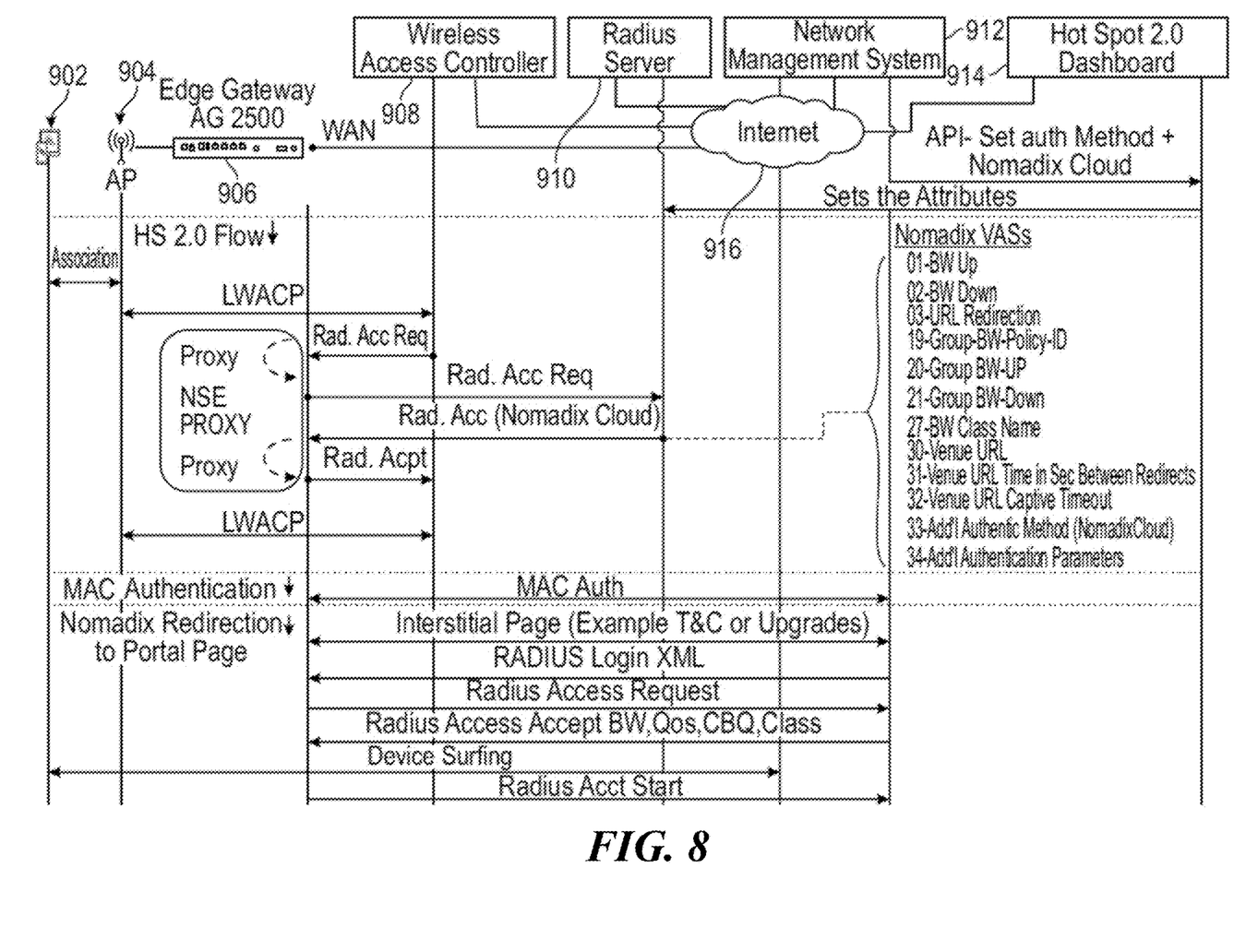
FIG. 8 illustrates a network environment and a workflow for extending Hotspot 2.0 Specification in accordance with aspects of this disclosure
Figure 9:
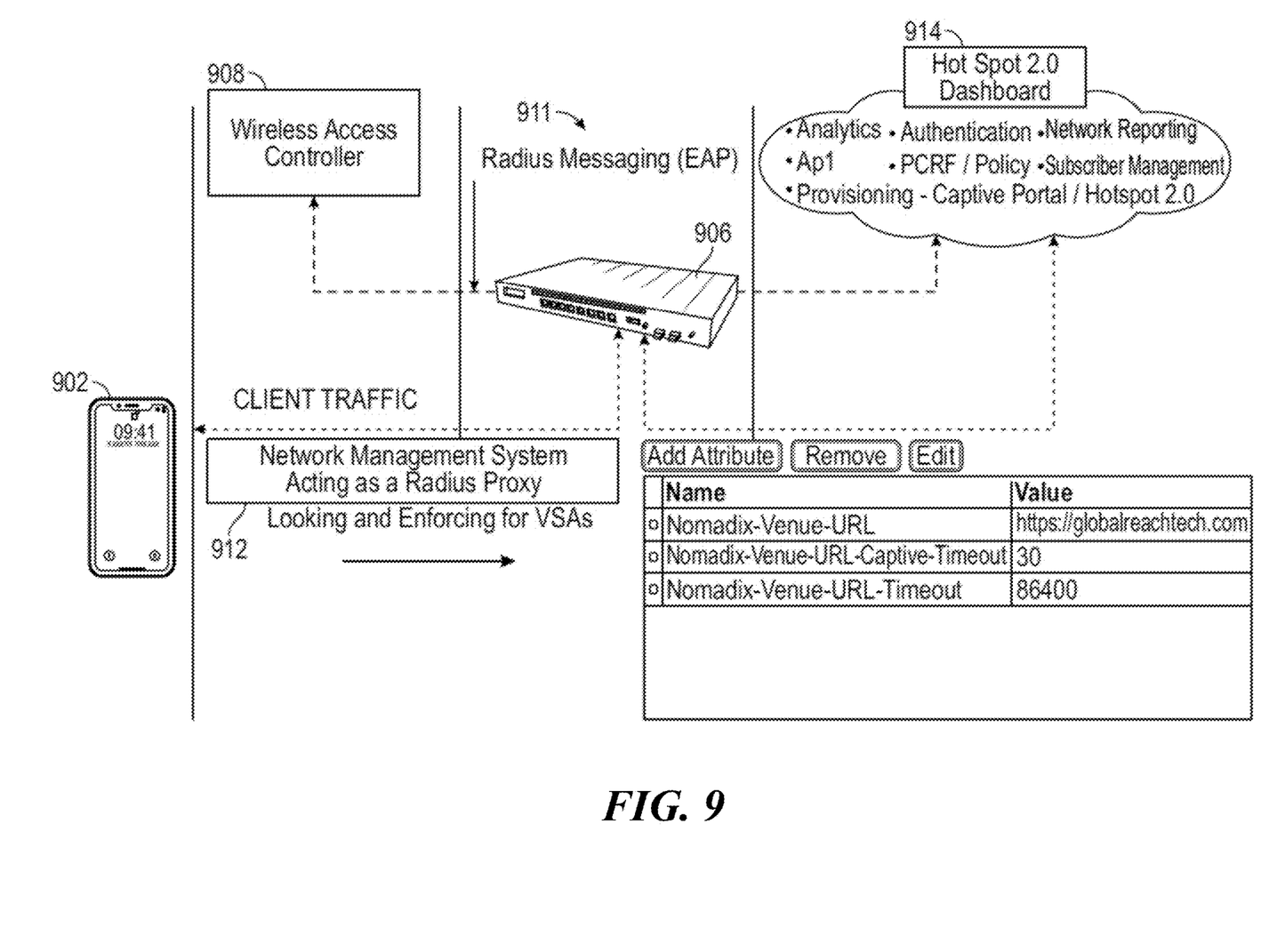
FIG. 9 illustrates a flow of communication through the gateway device in accordance with aspects of this disclosure.

FIGS. 8 and 9 illustrate a network architecture including a workflow for integrating a gateway with HS 2.0 to enable some of the features discussed above. One of the challenges in integrating additional authentication or other venue specific operations is that the user device may need access to the network to be directed to a particular link for authentication or remediation. It might be a catch 22 type situation where to receive access to the network, the user needs to be able to connect to the network, or at least some portion of the network.

As illustrated in FIGS. 8 and 9, when a user device 902 requests (e.g., via AP 904) a particular content on a network 916 (e.g., the Internet), the HS 2.0 profile installed on the device can be used to enable a first level of access. The gateway 906 is in the middle of all communications and can facilitate the integration. The network management system 912 can integrate with a venue system (like loyalty program of a hotel). The network management system 912 can also connect with the Radius Server 910 and the HS 2.0 Dashboard 914. Based on the information received from the Radius Server 910, the network management system 912 can provide parameters to the HS 2.0 Dashboard 914. The parameters can include, for example, captive portal URL. These parameters may not be understood by the wireless access controller 908. However, based on getting the authentication 911, the wireless access controller 908 can grant the user device 902 access to the network. The gateway 906 does understand the parameters and once the network access is granted, the gateway 906 can keep redirecting the user device 902 to the captive portal URL until specific steps are taken by the user, such as accepting terms and condition. The network management system 912 is also in the flow of data and will expect the redirect of the user device 902 to the captive portal URL. In some instances, the redirection may happen for a certain amount of time. The gateway 906 can maintain a flag stored in a memory to keep redirecting the user device 902 to captive portal URL. The network management system 912 can enable parameters from Radius Server to be integrated with the HS 2.0 dashboard 914.

Enumerated Implementations (EIs)

Some examples of enumerated implementations (EIs) are provided in this section, without limitation.

EI 1: A system for enabling a captive portal using durable and non-durable device identifiers, the system comprising: a cloud network management server configured to communicate with a RADIUS server to authenticate user devices; and a network management device configured to: receive a request from a user device to access a first network resource on an external network; transmit an access request to the RADIUS server, wherein the access request includes a durable identifier associated with the user device and a non-durable identifier associated with the user device; receive, from the RADIUS server, a first indication that the access request has been granted and a second indication that an additional user input is requested by the cloud network management server; forward the first indication to a wireless controller associated with the user device, without forwarding the second indication; receive an accounting start request to forward, to the RADIUS server, an indication that network access granted to the user device has been initiated; and without forwarding the accounting start request to the RADIUS server, cause the user device to be directed to a second network resource configured to receive the additional user input requested by the cloud network management server.

EI 2: The system of EI 1, wherein the network management device is further configured to: receive, from the cloud network management server, a third indication that the additional input has been provided by the user device; and cause the user device to be directed to the first network resource on the external network.

EI 3: The system of EI 2, wherein the network management device is further configured to, subsequent to receiving the third indication from the cloud network management server, transmit, to the RADIUS server, an indication that network access granted to the user device has been initiated.

EI 4: The system of EI 1, wherein the second network resource is a Web page, and the external network is the Internet.

EI 5: The system of EI 1, wherein the additional input requested by the cloud network management server comprises a user acceptance of an updated protocol associated with the network access to be granted to the user device.

EI 6: The system of EI 1, wherein the durable identifier associated with the user device is a parameter included in a user profile stored in the user device according to the Hotspot 2.0 Specification.

EI 7: The system of EI 1, wherein the non-durable identifier associated with the user device is a media access control (MAC) address of the user device.

EI 8: A computer-implemented method comprising: receiving a request from a user device to access a first network resource on an external network; transmitting an access request to a RADIUS server, wherein the access request includes a durable identifier associated with the user device and a non-durable identifier associated with the user device; receiving, from the RADIUS server, a first indication that the access request has been granted and a second indication that an additional user input is requested by a cloud network management server in communication with the RADIUS server; forwarding the first indication to a wireless controller associated with the user device, without forwarding the second indication; receiving an accounting start request to forward, to the RADIUS server, an indication that network access granted to the user device has been initiated; and without forwarding the accounting start request to the RADIUS server, causing the user device to be directed to a second network resource configured to receive the additional user input requested by the cloud network management server.

EI 9: The computer-implemented method of EI 8, further comprising: receiving, from the cloud network management server, a third indication that the additional input has been provided by the user device; and causing the user device to be directed to the first network resource on the external network.

EI 10: The computer-implemented method of EI 9, further comprising, subsequent to receiving the third indication from the cloud network management server, transmitting, to the RADIUS server, an indication that network access granted to the user device has been initiated.

EI 11: The computer-implemented method of EI 8, wherein the second network resource is a Web page, and the external network is the Internet.

EI 12: The computer-implemented method of EI 8, wherein the additional input requested by the cloud network management server comprises a user acceptance of an updated protocol associated with the network access to be granted to the user device.

EI 13: The computer-implemented method of EI 8, wherein the durable identifier associated with the user device is a parameter included in a user profile stored in the user device according to the Hotspot 2.0 Specification.

EI 14: The computer-implemented method of EI 8, wherein the non-durable identifier associated with the user device is a media access control (MAC) address of the user device.

EI 15: Non-transitory computer readable physical storage storing instructions that, when executed by a computing system, cause the computing system to at least: receive a request from a user device to access a first network resource on an external network; transmit an access request to a RADIUS server, wherein the access request includes a durable identifier associated with the user device and a non-durable identifier associated with the user device; receive, from the RADIUS server, a first indication that the access request has been granted and a second indication that an additional user input is requested by a cloud network management server; forward the first indication to a wireless controller associated with the user device, without forwarding the second indication; receive an accounting start request to forward, to the RADIUS server, an indication that network access granted to the user device has been initiated; and without forwarding the accounting start request to the RADIUS server, cause the user device to be directed to a second network resource configured to receive the additional user input requested by the cloud network management server.

EI 16: The non-transitory computer readable physical storage of EI 15, storing further instructions, that when executed by the computing system, cause the computing system to: receive, from the cloud network management server, a third indication that the additional input has been provided by the user device; and cause the user device to be directed to the first network resource on the external network.

EI 17: The non-transitory computer readable physical storage of EI 16, storing further instructions, that when executed by the computing system, cause the computing system to, subsequent to receiving the third indication from the cloud network management server, transmit, to the RADIUS server, an indication that network access granted to the user device has been initiated.

EI 18: The non-transitory computer readable physical storage of EI 15, wherein the additional input requested by the cloud network management server comprises a user acceptance of an updated protocol associated with the network access to be granted to the user device.

EI 19: The non-transitory computer readable physical storage of EI 15, wherein the durable identifier associated with the user device is a parameter included in a user profile stored in the user device according to the Hotspot 2.0 Specification.

EI 20: The non-transitory computer readable physical storage of EI 15, wherein the non-durable identifier associated with the user device is a media access control (MAC) address of the user device.

EI 21: A computer-implemented method comprising: receiving a first authentication request from a RADIUS server to authenticate a user device, wherein the authentication request includes a durable identifier associated with the user device and a non-durable identifier associated with the user device; storing an association between the durable identifier associated with the user device and the non-durable identifier associated with the user device; transmitting, to the RADIUS server, an indication that the first authentication request has been granted; receiving a second authentication request from the RADIUS server to authenticate the user device, wherein the authentication request includes the non-durable identifier associated with the user device; identifying the user device using the non-durable identifier included in the second authentication request and the association between the durable identifier and the non-durable identifier; determining that an additional user input is needed prior to granting network access to the user device; transmitting, to the RADIUS server, an indication that the first authentication request has been denied; receiving the additional user input from the user device; and transmitting, to a network management device associated with the user device, an indication that network access should be granted to the user device.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for enabling a captive portal using durable and non-durable device identifiers, the system comprising:
    a cloud network management server configured to communicate with a Remote Authentication Dial-In User Service (RADIUS) server to authenticate user devices; and
    a network management device comprising a microprocessor, the network management device configured to:
        receive a request from a user device to access a first network resource on an external network;
        transmit an access request to the RADIUS server, wherein the access request includes a durable identifier associated with the user device and a non-durable identifier associated with the user device;
        receive, from the RADIUS server, a first indication that the access request has been granted and a second indication that an additional user input is requested by the cloud network management server;
        forward the first indication to a wireless controller associated with the user device, without forwarding the second indication;
        receive an accounting start request to forward, to the RADIUS server, an indication that network access granted to the user device has been initiated; and
        without forwarding the accounting start request to the RADIUS server, cause the user device to be directed to a second network resource configured to receive the additional user input requested by the cloud network management server,
    wherein the network management device is further configured to:
        receive, from the cloud network management server, a third indication that the additional input has been provided by the user device; and
        cause the user device to be directed to the first network resource on the external network.

2. The system of claim 1, wherein the network management device is further configured to, subsequent to receiving the third indication from the cloud network management server, transmit, to the RADIUS server, an indication that network access granted to the user device has been initiated.

3. The system of claim 1, wherein the second network resource is a Web page, and the external network is the Internet.

4. The system of claim 1, wherein the additional input requested by the cloud network management server comprises a user acceptance of an updated protocol associated with the network access to be granted to the user device.

5. The system of claim 1, wherein the non-durable identifier associated with the user device is a media access control (MAC) address of the user device.

6. A computer-implemented method comprising:
receiving a request from a user device to access a first network resource on an external network;
transmitting an access request to a RADIUS server, wherein the access request includes a durable identifier associated with the user device and a non-durable identifier associated with the user device;
receiving, from the RADIUS server, a first indication that the access request has been granted and a second indication that an additional user input is requested by a cloud network management server in communication with the RADIUS server;
forwarding the first indication to a wireless controller associated with the user device, without forwarding the second indication;
receiving an accounting start request to forward, to the RADIUS server, an indication that network access granted to the user device has been initiated;
without forwarding the accounting start request to the RADIUS server, causing the user device to be directed to a second network resource configured to receive the additional user input requested by the cloud network management server;
receiving, from the cloud network management server, a third indication that the additional input has been provided by the user device; and
causing the user device to be directed to the first network resource on the external network.

7. The computer-implemented method of claim 6, further comprising, subsequent to receiving the third indication from the cloud network management server, transmitting, to the RADIUS server, an indication that network access granted to the user device has been initiated.

8. The computer-implemented method of claim 6, wherein the second network resource is a Web page, and the external network is the Internet.

9. The computer-implemented method of claim 6, wherein the additional input requested by the cloud network management server comprises a user acceptance of an updated protocol associated with the network access to be granted to the user device.

10. The computer-implemented method of claim 6, wherein the non-durable identifier associated with the user device is a media access control (MAC) address of the user device.

11. Non-transitory computer-readable physical storage storing instructions that, when executed by a computing system, cause the computing system to at least:
receive a request from a user device to access a first network resource on an external network;
transmit an access request to a RADIUS server, wherein the access request includes a durable identifier associated with the user device and a non-durable identifier associated with the user device;
receive, from the RADIUS server, a first indication that the access request has been granted and a second indication that an additional user input is requested by a cloud network management server;
forward the first indication to a wireless controller associated with the user device, without forwarding the second indication;
receive an accounting start request to forward, to the RADIUS server, an indication that network access granted to the user device has been initiated;
without forwarding the accounting start request to the RADIUS server, cause the user device to be directed to a second network resource configured to receive the additional user input requested by the cloud network management server;
receive, from the cloud network management server, a third indication that the additional input has been provided by the user device; and
cause the user device to be directed to the first network resource on the external network.

12. The non-transitory computer-readable physical storage of claim 11, storing further instructions, that when executed by the computing system, cause the computing system to, subsequent to receiving the third indication from the cloud network management server, transmit, to the RADIUS server, an indication that network access granted to the user device has been initiated.

13. The non-transitory computer-readable physical storage of claim 11, wherein the additional input requested by the cloud network management server comprises a user acceptance of an updated protocol associated with the network access to be granted to the user device.

14. The non-transitory computer-readable physical storage of claim 11, wherein the non-durable identifier associated with the user device is a media access control (MAC) address of the user device.

\* \* \* \* \*